United States Patent
Cho et al.

(10) Patent No.: US 10,063,102 B2
(45) Date of Patent: Aug. 28, 2018

(54) WIRELESS POWER TRANSMITTING APPARATUS AND METHOD

(71) Applicant: Samsung Electro-Mechanics Co., Ltd., Suwon-si (KR)

(72) Inventors: Jae Hyoung Cho, Suwon-si (KR); Jae Suk Sung, Suwon-si (KR); Sang Ho Cho, Suwon-si (KR); Eun Young Shin, Suwon-si (KR); Seung Won Park, Suwon-si (KR); Soon Tack Oh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 232 days.

(21) Appl. No.: 15/057,450

(22) Filed: Mar. 1, 2016

(65) Prior Publication Data

US 2016/0301218 A1    Oct. 13, 2016

(30) Foreign Application Priority Data

Apr. 10, 2015  (KR) .................. 10-2015-0050933

(51) Int. Cl.
*H02J 50/12* (2016.01)
*H04W 4/00* (2018.01)
*H02J 7/02* (2016.01)
*H04W 4/80* (2018.01)
*H04B 5/00* (2006.01)
*H04W 24/02* (2009.01)
*H02J 50/40* (2016.01)

(52) U.S. Cl.
CPC .............. *H02J 50/12* (2016.02); *H02J 7/025* (2013.01); *H04B 5/0037* (2013.01); *H04W 4/008* (2013.01); *H04W 4/80* (2018.02); *H02J 50/40* (2016.02); *H04W 24/02* (2013.01)

(58) Field of Classification Search
CPC ......... H04W 4/008; H02J 5/005; H02J 7/025; H02J 50/12
See application file for complete search history.

(56) References Cited

U.S. PATENT DOCUMENTS

2014/0347006 A1* 11/2014 Kim ................... H02J 7/025
                                                                320/108

FOREIGN PATENT DOCUMENTS

JP     2014-155399 A    8/2014
KR    10-2013-0057030 A    5/2013

* cited by examiner

*Primary Examiner* — Jeffrey Shin
(74) *Attorney, Agent, or Firm* — NSIP Law

(57) ABSTRACT

A wireless power transmitting method performed in a wireless power transmitting apparatus wirelessly transmitting power includes determining reception strength of a short-range wireless communication channel, adjusting an interval of a short beacon signal in response to a change in reception strength; and transmitting the short beacon signal at the interval.

16 Claims, 5 Drawing Sheets

WIRELESS POWER TRANSMITTING APPARATUS AND METHOD

CROSS-REFERENCE TO RELATED APPLICATION

This application claims the benefit of Korean Patent Application No. 10-2015-0050933 filed on Apr. 10, 2015 in the Korean Intellectual Property Office, the entire disclosure of which is incorporated herein by reference for all purposes.

BACKGROUND

1. Field

The following description relates to a wireless power transmitting apparatus and method.

2. Description of Related Art

In accordance with the development of wireless technology, various functions such as the transmission of data and the ability to transmit electrical power may be provided. Particularly, wireless power charging technology capable of charging electronic devices with power even in a non-contact state has recently been developed.

In the field of wireless power charging technology, it is necessary to confirm whether or not a wireless power receiving apparatus, a charging target, is adjacent to a wireless power transmitting apparatus.

To this end, in the related art, whether or not the wireless power receiving apparatus is adjacent to the wireless power transmitting apparatus has been confirmed through a short beacon signal being transmitting at a predetermined interval.

However, in the case of the related art, since the short beacon signal should be transmitted at the predetermined interval, a significant amount of power may be consumed by the transmission of the beacon signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a wireless power transmitting method performed in a wireless power transmitting apparatus wirelessly transmitting power, includes: determining reception strength of a short-range wireless communication channel; adjusting an interval of a short beacon signal in response to a change in reception strength; and transmitting the short beacon signal at the interval.

The adjusting of the interval of the short beacon signal may include decreasing the interval of the short beacon signal as reception strength is increased.

The adjusting of the interval of the short beacon signal may include decreasing the interval of the short beacon signal when reception strength exceeds a reference value.

The adjusting of the interval of the short beacon signal may include increasing the interval of the short beacon signal when reception strength is equal to a reference value or less.

The adjusting of the interval of the short beacon signal may include setting the interval of the short beacon signal to infinity when reception strength is equal to a minimum threshold value or less.

The wireless power transmitting may further include wirelessly providing the power to a wireless power receiving apparatus when a change in impedance for the short beacon signal is sensed and reception strength exceeds a reference value.

The wireless power transmitting may further include maintaining the interval of the short beacon signal or increasing the interval of the short beacon signal when a change in impedance for the short beacon signal is sensed and reception strength is equal to a reference value or less.

The reception strength of the short-range wireless communication channel may include a received signal strength indicator (RSSI) of a Bluetooth communications line.

According to another general aspect, a wireless power transmitting apparatus includes a power transmitter configured to transmit a short beacon signal; a wireless communication receiver configured to determine reception strength of a short-range wireless communication channel; and a controller configured to adaptively control the power transmitter to adjust an interval of the short beacon signal in response to a change in reception strength.

The controller may be further configured to control the power transmitter to decrease the interval of the short beacon signal as reception strength is increased.

The controller may be configured to control the power transmitter to decrease the interval of the short beacon signal when reception strength exceeds a reference value.

The controller may be configured to control the power transmitter to increase the interval of the short beacon signal when reception strength is equal to a reference value or less.

The controller may be configured to set the interval of the short beacon signal to substantially infinity when reception strength is equal to a minimum threshold value or less.

The wireless power transmitting apparatus may further include a resonator configured to magnetically couple to a wireless power receiving apparatus depending on a switching operation of the power transmitter; and a detector configured to sense a change in impedance for the resonator.

The controller may be further configured to control the power transmitter to wirelessly transmit power to the wireless power receiving apparatus when the change in impedance is sensed and reception strength exceeds a reference value.

The controller may be further configured to control the power transmitter to maintain the interval of the short beacon signal or increase the interval of the short beacon signal when the change in impedance is sensed and reception strength is equal to a reference value or less.

According to another general aspect, a wireless power reception apparatus includes: a power receiver configured to receive a long and a short beacon signal and magnetically couple with a source thereof; a wireless communication transmitter configured to broadcast at a predetermined power-level in a short-range wireless communication channel; and, a controller configured to adaptively control the power receiver in response to a long beacon signal, reception of a wireless power, or combinations thereof.

The power receiver may include a rectifier coupled to a converter and a switch network.

The wireless communication transceiver may be further configured to enable broadcast at a predetermined power-level responsive to reception of a short beacon signal from a wireless power transmitter.

The power receiver may be further configured to change an impedance of the received short beacon signal in a wireless power transmitting apparatus.

Other features and aspects will be apparent from the following detailed description, the drawings, and the claims.

BRIEF DESCRIPTION OF THE DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
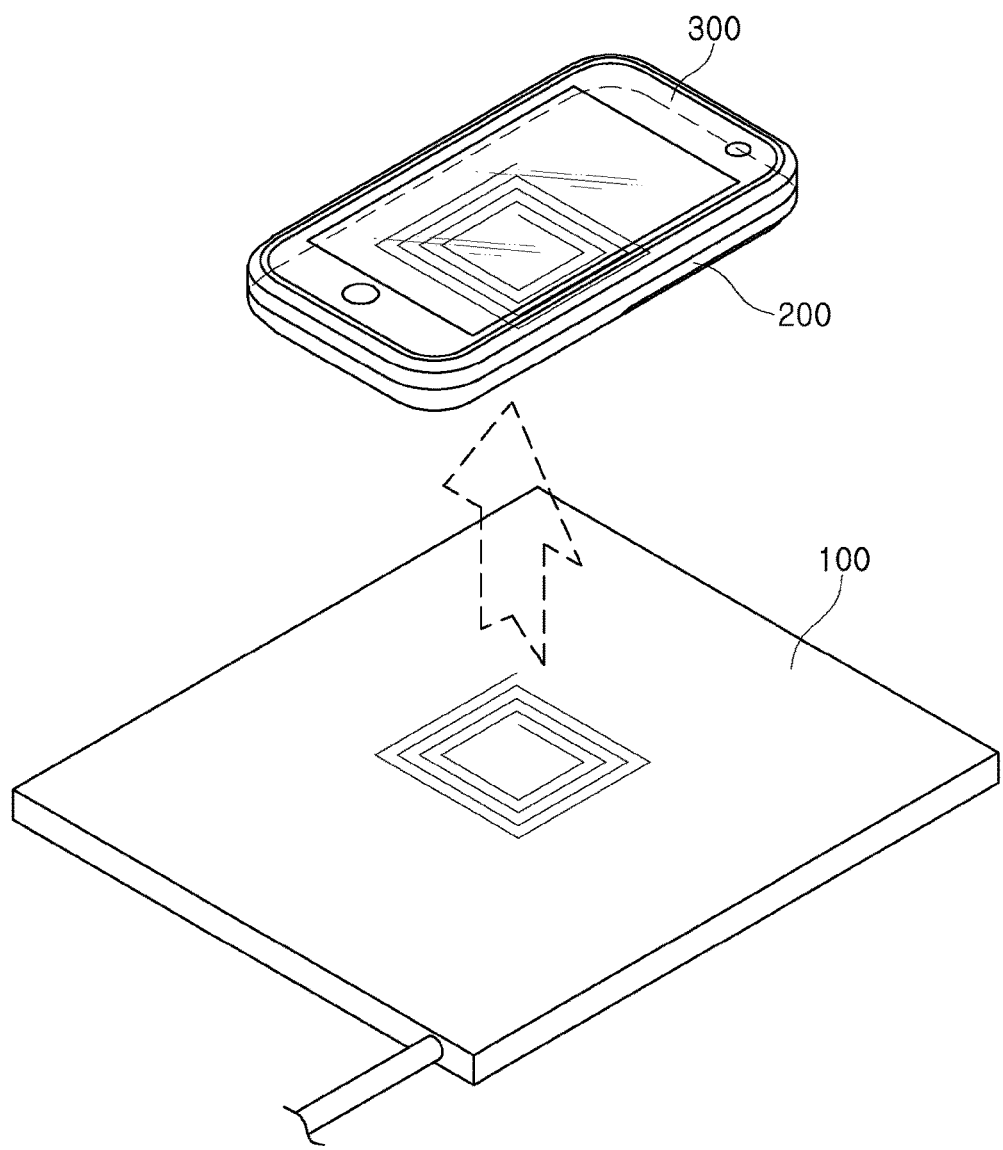
FIG. 1 is a view illustrating examples of a wireless power transmitting apparatus and a wireless power receiving apparatus according to an exemplary embodiment.

FIG. 1 is a view illustrating examples of a wireless power transmitting apparatus and a wireless power receiving apparatus according to an exemplary embodiment.

As illustrated FIG. 1, a wireless power transmitting apparatus 100 may wirelessly provide power to a wireless power receiving apparatus 200. The wireless power receiving apparatus 200 may supply the wirelessly received power to an electronic device 300.

The wireless power transmitting apparatus 100 may include a transmitting coil. The transmitting coil may be coupled, for example magnetically, inductively, resonantly, or through other suitable measures, to a receiving coil of the wireless power receiving apparatus 200 to provide power to the receiving coil wirelessly. Although a case in which the wireless power transmitting apparatus 100 includes a single transmitting coil has been illustrated, this is only an example, and the wireless power transmitting apparatus 100 may also include a plurality of transmitting coils. Additionally, the wireless power receiving apparatus 200 may also include a plurality of receiving coils. Where a plurality of coils are provided, they may be spaced apart in a co-planar arrangement or arranged orthogonally or transverse one to another or any other suitable arrangement for the transmission and reception of power.

The wireless power transmitting apparatus 100 may adjust an interval of a short beacon signal depending on whether the wireless power receiving apparatus 200 is close thereto or distant therefrom. For example, the wireless power transmitting apparatus 100 may increase the interval of the short beacon signal in a case in which the wireless power receiving apparatus 200 is distant therefrom. As a result, the number of short beacon signals transmitted in a standby state may be decreased to decrease standby power consumption. "Close" with relation to wireless power transmission may be defined as within a suitable distance to receive wireless power which may depend upon the application, size and number of coils, frequency, and the like; whereas "distant" may be defined as outside a distance for receiving wireless power at a reasonable efficiency level.

Hereinafter, the wireless power transmitting apparatus 100 will be described in more detail with reference to FIGS. 2 through 8.

Figure 2:
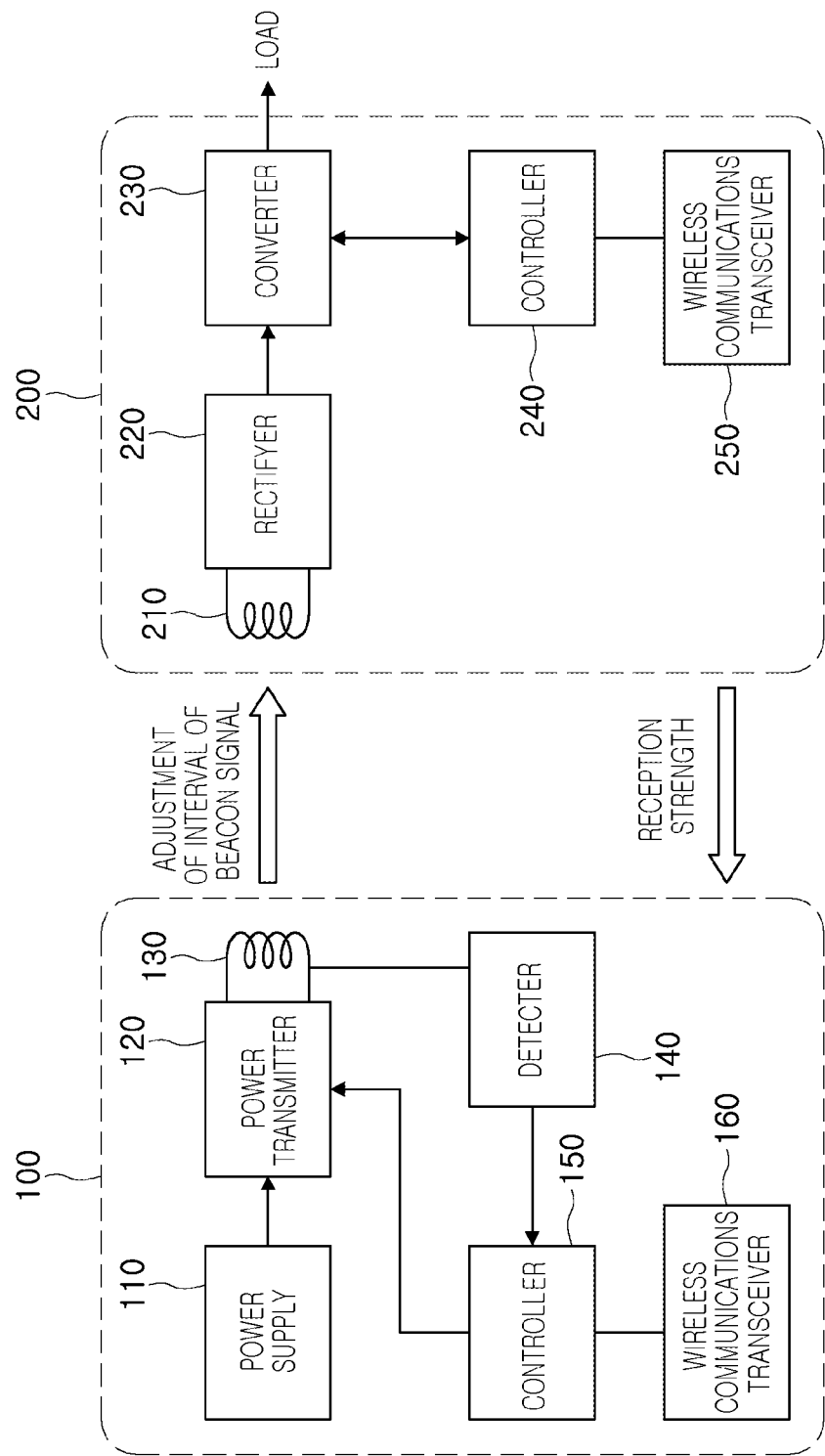
FIG. 2 is a block diagram illustrating a wireless power transmitting apparatus and the wireless power receiving apparatus according to an exemplary embodiment.

FIG. 2 is a block diagram illustrating the wireless power transmitting apparatus and the wireless power receiving apparatus according to an exemplary embodiment in the present disclosure.

Referring to FIG. 2, the wireless power transmitting apparatus 100 may confirm reception strength of short-range wireless communication channel and adjust an interval of a beacon signal transmitted to the wireless power receiving apparatus 200 depending on reception strength.

Herein, various methods of performing wireless communications at close range are collectively termed short-range wireless communications. Thus, the present disclosure does not particularly limit a frequency or signal scheme of short-range wireless communications. For example, techniques such as BLUETOOTH® version 1-4.2+(e.g. IEEE 802.15 using, for example, about 2.4 to about 2.485 GHz), ZIGBEE® (IEEE 802.15.4), ultra wide band (UWB), Wi-Fi (e.g. IEEE 802.11b High Rate), RFID, NFC, Infrared IR, and any other suitable technique which may be used for short-range wireless communications. While various exemplary close or short range communication schemes have been described above, the terms "close" or "short range" with respect to communication schemes may have an altogether different meaning with respect to wireless power transmission. Effective distances for the wireless transmission of power generally are based on frequency, reception and transmission antenna size and orientation and are generally much shorter than effective distances for wireless communication.

The wireless power transmitting apparatus 100 may include a power transmitter 120, a resonator 130, a detector 140, a controller 150, and a wireless communications transceiver 160. Wireless communications transceiver 160 may include a receiver and/or transmitter but for conciseness and clarity, it will be referred to as simple a transceiver. According to exemplary embodiments, the wireless power transmitting apparatus 100 may further include a power supply 110.

The power supply 110 may supply power to respective components of the wireless power transmitting apparatus 100. For example, the power supply 110 may be a power supply receiving commercial alternating current (AC) power (e.g. 110V at 60 Hz), converting the commercial AC power into direct current (DC) signals (e.g. 5V), and supplying the DC signals to the respective components of the wireless power transmitting apparatus 100.

The power transmitter 120 is connected to a transmitting coil of the resonator 130 and wirelessly transmits a beacon signal (a short beacon signal or a long beacon signal) or power.

In an exemplary embodiment, the power transmitter 120 may include a plurality of switches. The plurality of switches may perform a switching operation to allow the transmitting coil to be e.g. magnetically coupled to the receiving coil.

The resonator 130 may be magnetically coupled to a resonator 210 of the wireless power receiving apparatus 200.

The resonator 130 includes the transmitting coil. The transmitting coil may be magnetically coupled to a receiving coil of the wireless power receiving apparatus 200 to transmit the beacon signal (the short beacon signal or the long beacon signal) or wirelessly transmit the power.

The detector 140 may sense changes in impedance in the resonator 130.

In an exemplary embodiment, the detector 140 is configured to sense a change in impedance for the short beacon signal when the resonator 130 transmits the short beacon signal. In a case in which an object (such as a wireless power receiving apparatus 200) is present in the vicinity of the wireless power transmitting apparatus 100 when the short beacon signal is transmitted, a change in impedance may be caused in the resonator 130 due to the corresponding object. Therefore, the detector 140 may sense whether or not the change in impedance has occurred when the resonator 130 transmits the short beacon signal, and responsively inform the controller 150 that the change in impedance has occurred.

In an exemplary embodiment, the detector 140 may detect a current or a voltage flowing in the transmitting coil to sense whether or not the change in impedance has occurred. For example, the detector 140 may detect a first sensed voltage from the current flowing in the transmitting coil. The controller 150 may decide a change amount in the impedance of the transmitting coil using a change amount of the first sensed voltage.

In another exemplary embodiment, the detector 140 may detect a current or a voltage output from an amplifying circuit included in the power transmitter 120 to sense whether or not the change in impedance has occurred. For example, the detector 140 may detect a second sensed voltage from the output current of the amplifying circuit. The controller 150 may decide a change amount in the impedance of the transmitting coil using a change amount of the second sensed voltage.

The controller 150 may control an operation of the power transmitter 120 to transmit a beacon signal or wirelessly transmit the power.

The controller 150 may include at least one processing unit. According to exemplary embodiments, the controller 150 may further include a memory. The processing unit may include, for example, a central processing unit (CPU), a graphic processing unit (GPU), a microprocessor, an application specific integrated circuit (ASIC), a field programmable gate array (FPGA), or the like, and have a plurality of cores. The memory may be a volatile memory (for example, a random access memory (RAM), or the like), a non-volatile memory (for example, a read only memory (ROM), a flash memory, or the like), or a combination thereof.

The controller 150 may confirm reception strength of short-range wireless communication channel through the wireless communications transceiver 160. For example, a wireless communications transceiver 250 of the wireless power receiving apparatus 200 may be in an activated state, and the wireless communications transceiver 160 of the wireless power transmitting apparatus 100 may obtain reception strength for the wireless communications transceiver 250 of the wireless power receiving apparatus 200. The controller 150 may adjust the interval of the short beacon signal depending on whether or not the reception strength of the wireless communications transceiver 250 is changed.

In an exemplary embodiment, the wireless communications transceiver 160 may include a Bluetooth module, and reception strength may be a received signal strength indicator (RSSI) of a Bluetooth communications channel.

In a case in which the wireless communications transceiver 160 includes other short-range wireless communication modules, reception strength may be a predetermined reception strength measurable in the corresponding other short-range wireless modules. Where several wireless communication modules are present, the adaptive determination of signal beacon interval may be based, in part, on a ratio, comparison, or summation of the reception strength of the several wireless communication modules.

In an exemplary embodiment, the controller 150 may adjust a length of the interval of the short beacon signal to be in inverse proportion to an increase or a decrease in reception strength. For example, the controller 150 may decrease the interval of the short beacon signal as reception strength is increased. Since a state in which reception strength is large may be considered as a state in which the wireless power receiving apparatus 200 is adjacent to the wireless power transmitting apparatus 100, the controller 150 may allow the short beacon signal to be more frequently transmitted as reception strength is increased. When the short beacon signal is frequently transmitted, the controller 150 may rapidly confirm whether or not the wireless power transmitting apparatus 100 is present within a chargeable range.

In an exemplary embodiment, the controller 150 may adjust the interval of the short beacon signal in relation to a reference value for reception strength. For example, the controller 150 may decrease the interval of the short beacon signal when reception strength exceeds the reference value. Additionally, the interval of the short beacon signal may be gradually increased responsive to a lookup table indexing reception strength to expected distance and also to short beacon interval.

In an exemplary embodiment, the controller 150 may increase the interval of the short beacon signal when reception strength is equal to the reference value or less.

The controller 150 may adjust the interval of the short beacon signal in relation to two or more reference values. For example, the controller 150 may decrease the interval of the short beacon signal when reception strength is higher than a first reference value and increase the interval of the short beacon signal when reception strength is a second reference value or less. Here, the first reference value may be reception strength higher than the second reference value.

In an exemplary embodiment, the controller 150 may not transmit the short beacon signal when reception strength is lower than a minimum threshold value. For example, the controller 150 may set the interval of the short beacon signal to infinity when reception strength is equal to the minimum threshold value or less.

In an exemplary embodiment, the controller 150 may wirelessly provide the power to the wireless power receiving apparatus 200 when the impedance of the resonator 130 for the short beacon signal is changed and reception strength exceeds the reference value. That is, in the present exemplary embodiment, the wireless power transmitting apparatus 100 may perform a procedure for providing the power without transmitting the long beacon signal. Although the long beacon signal is a signal waking up the wireless communications transceiver 250 of the wireless power receiving apparatus 200, since reception strength of the reference value or more has been detected in the present exemplary embodiment, it is decided that the wireless communications transceiver 250 of the wireless power receiving apparatus 200 has already been in operation, such that the transmission of the long beacon signal is omitted.

In an exemplary embodiment, the controller 150 may leave the interval of the short beacon signal as it is or increase the interval of the short beacon signal when the impedance of the resonator 130 for the short beacon signal is changed and reception strength is equal to the reference value or less. That is, in the present exemplary embodiment, since the impedance of the resonator 130 has been changed, a specific object approaches the wireless power transmitting apparatus 100, but reception strength is equal to the reference value or less, such that the wireless power receiving apparatus 200 may be in a state in which it is distant from the wireless power transmitting apparatus 100. Therefore, in this example, since it may be decided that the object approaching the wireless power transmitting apparatus 100 is not the wireless power receiving apparatus 200, the controller 150 may leave the interval of the short beacon signal as it is or increase the interval of the short beacon signal.

In the present specification, the reference value or the minimum threshold value may mean a specific reception strength value. Therefore, the reference value or the minimum threshold may be a preset value or a value input externally. Alternatively, the reference value or the minimum threshold may also be a value variably determined by the controller 150 depending on an environmental variable.

The wireless power receiving apparatus 200 includes the resonator 210 including the receiving coil. Power induced through the resonator 210 may be rectified through a rectifier 220, be converted by a converter 230, and may then be provided to a load. A controller 240 may control an operation of the rectifier 220 or the converter 230 to wirelessly receive the power. A wireless communications transceiver 250 may form a short-range wireless communication channel together with the wireless communications transceiver 160 of the wireless power transmitting apparatus 100.

Figure 3:
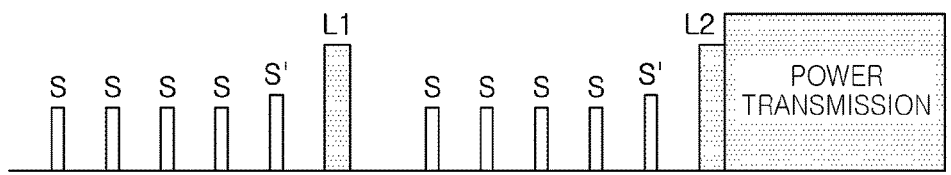
FIG. 3 is a view illustrating an example of a beacon signal transmitted from the wireless power transmitting apparatus according to an exemplary embodiment.

FIG. 3 is a view illustrating an example of a beacon signal transmitted from the wireless power transmitting apparatus. The beacon signal illustrated in FIG. 3 may be transmitted from the resonator 130 (see FIG. 2).

Referring to FIG. 2 and FIG. 3, the wireless power transmitting apparatus 100 may periodically transmit short beacon signals S.

When a change in impedance has been generated in the transmitting coil transmitting a short beacon signal S', it may mean that an object approaches the wireless power transmitting apparatus 100. Therefore, the controller 150 may control the power transmitter 120 to transmit long beacon signals L1 or L2 when a sensed voltage for a transmitting coil current provided from the detector 140 is changed.

When a response to the long beacon signal L2 is received, the controller 150 may control the power transmitter 120 to wirelessly transmit the power.

However, as described above, according to exemplary embodiments, the controller 150 may confirm the reception strength of the short-range wireless communication channel or the change amount in the impedance, thereby controlling the power transmitter 120 to wirelessly transmit the power without transmitting the long beacon signals L1 and L2.

Hereinafter, various examples of adjusting an interval of a short beacon signal will be described with reference to FIGS. 4 through 6.

Figure 4:
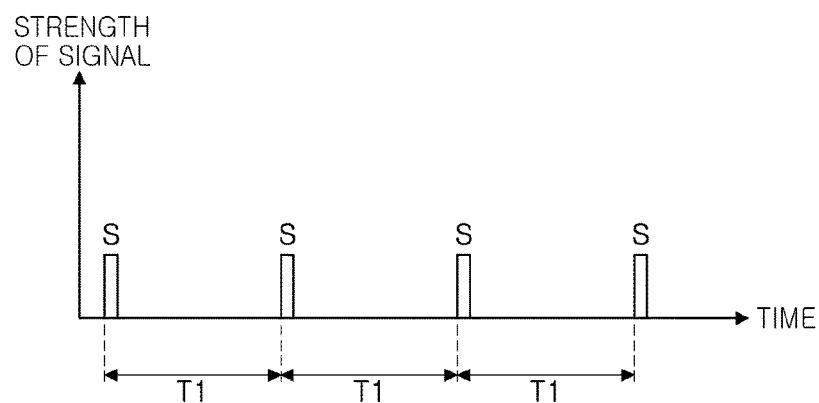
FIGS. 4 through 6 are views illustrating various examples of adjusting an interval of a short beacon signal in the wireless power transmitting apparatus according to an exemplary embodiment.

A short beacon signal illustrated in FIG. 4 may be a short beacon signal in a normal state. Therefore, it may be appreciated that the short beacon signal is transmitted at a predetermined interval T1. In the present example, the reception strength of the short-range wireless communication channel may be in a predetermined range (this case corresponds to a case in which reception strength is between the first reference value and the second reference value in the exemplary embodiment described above).

Figure 5:
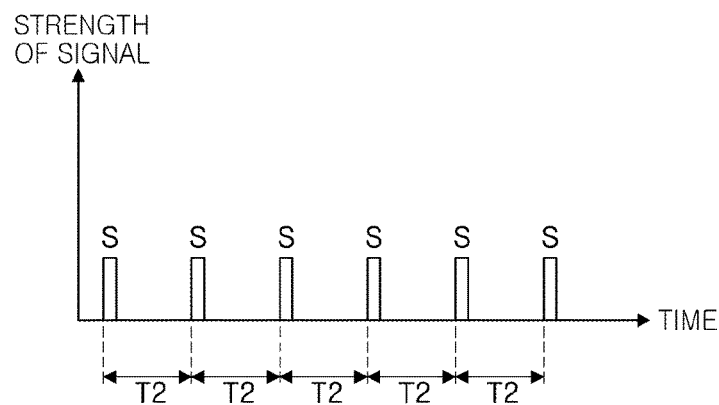

FIG. 5 illustrates a case in which the reception strength of the short-range wireless communication channel is increased further than a predetermined reference level. As illustrated in FIG. 5, it may be appreciated that an interval T2 of the short beacon signal becomes lower than the interval T1 of FIG. 4. One plausible meaning which can be inferred from the reception strength of the short-range wireless communication channel increase is that the wireless power receiving apparatus 200 becomes closer to the wireless power transmitting apparatus 100. Accordingly, then, the interval T1 of the short beacon signal may be decreased to T2 in order to more accurately and rapidly recognize the wireless power receiving apparatus 200.

Figure 6:
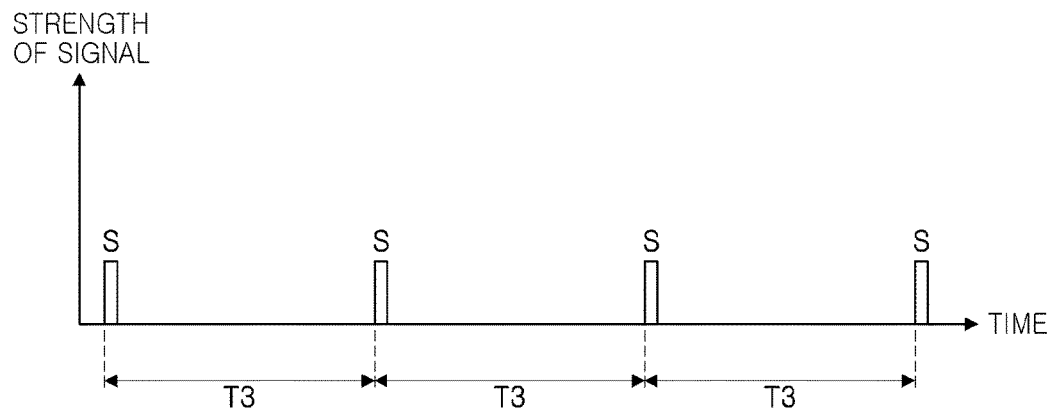

FIG. 6 illustrates a case in which the reception strength of the short-range wireless communication channel is lower than a predetermined reference level. As illustrated in FIG. 6, it may be appreciated that an interval T3 of the short beacon signal is increased further than the interval T1 of FIG. 4. Since an inference may be drawn that as the reception strength of the short-range wireless communication channel becomes smaller, that the wireless power receiving apparatus 200 becomes more distant from the wireless power transmitting apparatus 100, and the interval T1 of the short beacon signal may accordingly be increased to T3 in order to decrease consumption of a standby power by the short beacon signal.

Figure 7:
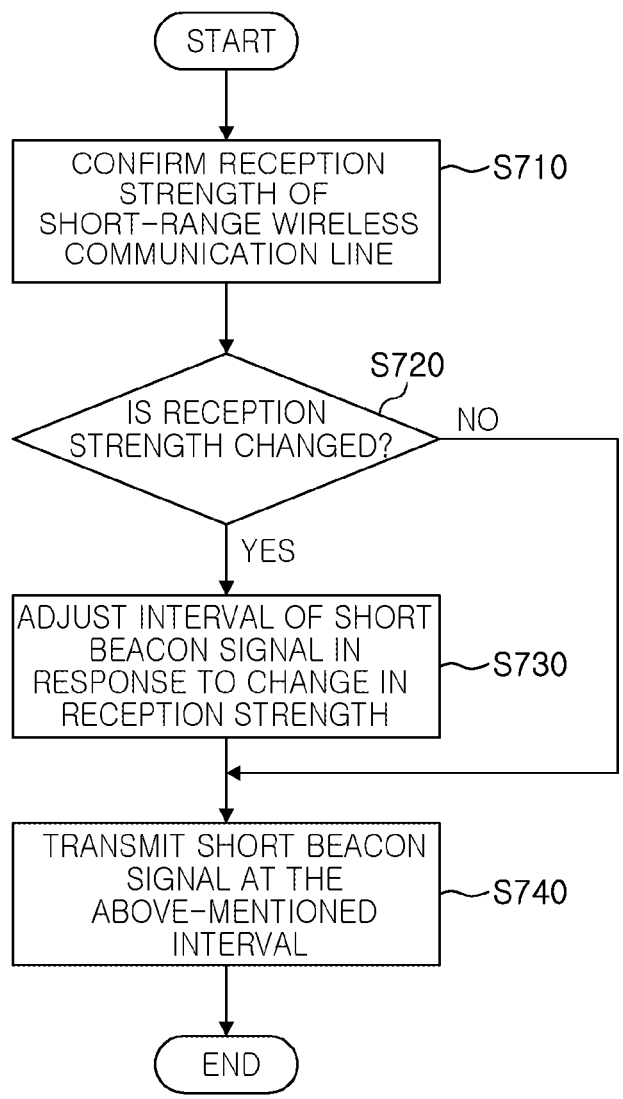
FIG. 7 is a flow chart illustrating an example of a wireless power transmitting method according to an exemplary embodiment.

FIG. 7 is a flow chart illustrating a wireless power transmitting method according to an exemplary embodiment. Various examples of a wireless power transmitting method to be described below may be performed in the wireless power transmitting apparatus described above with reference to FIGS. 1 through 6. Therefore, descriptions of contents the same as or corresponding to the contents described above will be omitted in order to avoid an overlapped description for clarity and conciseness. However, contents that are the same as or correspond to the contents described above may be easily understood from the contents described above with reference to FIGS. 1 through 6.

Referring to FIG. 1 and FIG. 7, the wireless power transmitting apparatus 100 may confirm the reception strength of the short-range wireless communication channel (S710).

When reception strength is changed (YES of S720), the wireless power transmitting apparatus 100 may adjust the interval of the short beacon signal in response to the change in reception strength (S730).

Meanwhile, when reception strength is not changed (NO of S720), the wireless power transmitting apparatus 100 may not adjust the interval of the short beacon signal.

The wireless power transmitting apparatus 100 may transmit the short beacon signal at the above-mentioned interval (S740).

In an example of S730, the wireless power transmitting apparatus 100 may decrease the interval of the short beacon signal as reception strength is increased.

In an example of S730, the wireless power transmitting apparatus 100 may decrease the interval of the short beacon signal when reception strength exceeds the reference value.

In an example of S730, the wireless power transmitting apparatus 100 may increase the interval of the short beacon signal when reception strength is equal to the reference value or less.

In an example of S730, the wireless power transmitting apparatus 100 may set the interval of the short beacon signal to infinity as reception strength is equal to the minimum threshold value or less.

In an exemplary embodiment, the wireless power transmitting apparatus 100 may wirelessly provide the power to the wireless power receiving apparatus 200 when the change in impedance for the short beacon signal is sensed and reception strength exceeds the reference value.

In an exemplary embodiment, the wireless power transmitting apparatus 100 may leave the interval of the short beacon signal as it is or increase the interval of the short beacon signal when the change in impedance for the short beacon signal is sensed and reception strength is equal to the reference value or less.

As set forth above, the wireless power transmitting apparatus according to an exemplary embodiment in the present disclosure may consume a low power in a standby state.

The apparatuses, units, modules, devices, and other components (e.g., the power supply 110, power transmitter 120, controller 150, detector 140, wireless communications transceiver 160, rectifier 220, converter 230, controller 240) illustrated in FIGS. 1-2 that perform the operations described herein with respect to FIGS. 3-7 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both.

In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-7 that perform the operations described herein may be performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, an electronic device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitting method performed in a wireless power transmitting apparatus wirelessly transmitting power, comprising:
   determining reception strength of a short-range wireless communication channel;
   adjusting an interval of a short beacon signal in response to a change in reception strength; and
   transmitting the short beacon signal at the interval.

2. The wireless power transmitting method of claim 1, wherein the adjusting of the interval of the short beacon signal includes decreasing the interval of the short beacon signal as reception strength is increased.

3. The wireless power transmitting method of claim 1, wherein the adjusting of the interval of the short beacon signal includes decreasing the interval of the short beacon signal when reception strength exceeds a reference value.

4. The wireless power transmitting method of claim 1, wherein the adjusting of the interval of the short beacon signal includes increasing the interval of the short beacon signal when reception strength is equal to a reference value or less.

5. The wireless power transmitting method of claim 1, wherein the adjusting of the interval of the short beacon signal includes setting the interval of the short beacon signal to infinity when reception strength is equal to a minimum threshold value or less.

6. The wireless power transmitting method of claim 1, further comprising wirelessly providing the power to a wireless power receiving apparatus when a change in impedance for the short beacon signal is sensed and reception strength exceeds a reference value.

7. The wireless power transmitting method of claim 1, further comprising maintaining the interval of the short beacon signal or increasing the interval of the short beacon signal when a change in impedance for the short beacon signal is sensed and reception strength is equal to a reference value or less.

8. The wireless power transmitting method of claim 1, wherein the reception strength of the short-range wireless communication channel is a received signal strength indicator (RSSI) of a Bluetooth communications line.

9. A wireless power transmitting apparatus comprising:
   a power transmitter configured to transmit a short beacon signal;
   a wireless communication receiver configured to determine reception strength of a short-range wireless communication channel; and
   a controller configured to adaptively control the power transmitter to adjust an interval of the short beacon signal in response to a change in reception strength.

10. The wireless power transmitting apparatus of claim 9, wherein the controller is further configured to control the power transmitter to decrease the interval of the short beacon signal as reception strength is increased.

11. The wireless power transmitting apparatus of claim 9, wherein the controller is further configured to control the power transmitter to decrease the interval of the short beacon signal when reception strength exceeds a reference value.

12. The wireless power transmitting apparatus of claim 9, wherein the controller is configured to control the power transmitter to increase the interval of the short beacon signal when reception strength is equal to a reference value or less.

13. The wireless power transmitting apparatus of claim 9, wherein the controller is further configured to set the interval of the short beacon signal to substantially infinity when reception strength is equal to a minimum threshold value or less.

14. The wireless power transmitting apparatus of claim 9, further comprising:
   a resonator configured to magnetically couple to a wireless power receiving apparatus depending on a switching operation of the power transmitter; and
   a detector configured to sense a change in impedance for the resonator.

15. The wireless power transmitting apparatus of claim 14, wherein the controller is further configured to control the power transmitter to wirelessly transmit power to the wireless power receiving apparatus when the change in impedance is sensed and reception strength exceeds a reference value.

16. The wireless power transmitting apparatus of claim 14, wherein the controller is further configured to control the power transmitter to maintain the interval of the short beacon signal or increase the interval of the short beacon signal when the change in impedance is sensed and reception strength is equal to a reference value or less.

* * * * *